(12) United States Patent
Callaghan

(10) Patent No.: US 7,334,159 B1
(45) Date of Patent: Feb. 19, 2008

(54) SELF-TESTING RAM SYSTEM AND METHOD

(75) Inventor: David M. Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 496 days.

(21) Appl. No.: 10/674,044

(22) Filed: Sep. 29, 2003

(51) Int. Cl.
*G06F 11/00* (2006.01)

(52) U.S. Cl. ............. 714/30; 714/5; 714/6; 714/8; 714/42; 365/200

(58) Field of Classification Search .......... 714/5, 714/6, 8, 715, 797, 30, 42; 365/200
See application file for complete search history.

(56) References Cited

U.S. PATENT DOCUMENTS

| | | | |
|---|---|---|---|
| 4,939,694 A | | 7/1990 | Eaton et al. |
| 5,036,516 A | | 7/1991 | Cordell |
| 5,535,328 A | | 7/1996 | Harari et al. |
| 5,570,374 A | | 10/1996 | Yav et al. |
| 5,617,531 A | * | 4/1997 | Crouch et al. ............ 714/30 |
| 5,751,729 A | | 5/1998 | Aybay |
| 5,781,721 A | * | 7/1998 | Hayes et al. ............. 714/42 |
| 5,907,671 A | * | 5/1999 | Chen et al. .............. 714/6 |
| 6,041,426 A | | 3/2000 | Qureshi |
| 6,141,768 A | * | 10/2000 | Lin et al. .................. 714/8 |
| 6,505,305 B1 | * | 1/2003 | Olarig ...................... 714/5 |
| 6,564,319 B1 | | 5/2003 | Peters et al. |
| 6,738,878 B2 | | 5/2004 | Ripley et al. |
| 6,879,530 B2 | * | 4/2005 | Callaway et al. ......... 365/201 |
| 6,968,397 B1 | | 11/2005 | Kanamoto |
| 6,968,479 B2 | * | 11/2005 | Wyatt et al. ............. 714/53 |
| 7,069,389 B2 | | 6/2006 | Cohen |
| 7,073,064 B1 | | 7/2006 | Angelo et al. |

OTHER PUBLICATIONS

"Gallium Arsenide" "ECC" "Interrupt" "Cache" Microsoft Computer Dictionary (fifth edition). Copyright 2002. Microsoft Press.*
"FPGA" "Register" Microsoft Computer Dicitonary (fifth edition). Copyright 2002. Microsoft Press.*
Younggap You, "A Self-Testing Dynamic RAM Chip", Feb. 1985, 7 pages.
"Cyclic Redunancy Check" Nov. 17, 2003, Retrieved from http://en.wikipedia.org/wiki/Cyclic_redunancy_check as archived by http:www.archive.org.

* cited by examiner

*Primary Examiner*—Robert Beausoliel
*Assistant Examiner*—Joseph D Manoskey
(74) *Attorney, Agent, or Firm*—Amin Turocy & Calvin LLP; R. Scott Speroff

(57) ABSTRACT

A self-testing and correcting random access memory (RAM) device and methodology is disclosed herein. The device includes at least one array of memory to enable data storage and self-testing RAM interface for evaluating, correcting, and/or compensating for memory cell errors. The RAM device, via the self-testing RAM interface, supports interaction with a central processing unit (CPU) to facilitate testing of the CPU to memory interface as well as the device memory array. Upon detection of memory errors, the self-testing RAM interface can notify the CPU, notify an exception handler, correct, and/or compensate for the errors. Error correction can be accomplished using error correction codes (ECCs) alone or in combination with retrieval and replacement of erroneous data with correct data stored in different locations. Memory cells that are physically defective and incapable of maintaining data integrity can be compensated for by mapping defective cells to a plurality of reserved replacement cells.

39 Claims, 12 Drawing Sheets

SELF-TESTING RAM SYSTEM AND METHOD

TECHNICAL FIELD

The present invention relates generally to computer systems, and more particularly to a system and method for self-testing and correcting memory devices.

BACKGROUND

Computer information technology continues to spread epidemically throughout our technological society. Moreover, the proliferation of such technology fuels a persistent demand for smaller and higher density storage devices. At present, computer technologies pervade many aspects of modern life in the form of portable devices such as PDA's, phones, pagers, digital cameras and voice recorders, MP3 players, and laptop computers to name but a few. Furthermore, behind the scenes, business and industry rely heavily on computers to reduce cost and produce products more efficiently. The fervent societal desire for omnipresent computing technologies ensures that the movement toward developing small, fast, low power, inexpensive, and high-density memory will continue into the distant future. To achieve such high densities, there has been and continues to be efforts in the semiconductor industry toward scaling down device dimensions (e.g., at sub-micron levels) on semiconductor wafers. In order to accomplish such high device packing density, smaller and smaller feature sizes are required. Devices fabricated with sub-micron feature sizes, however, have an increased likelihood of containing errors or contaminated data.

Popular volatile memory technologies such as dynamic random access memory (DRAM) and synchronous random access memory (SRAM) are known to be susceptible to both hard errors and soft errors. These small geometry or high density memory cells are also more susceptible to data corruption from a variety of sources. Hard errors or faults occur when there is a physical failure in the digital circuitry, for example, due to a problem in the design or manufacturing of a device or due to physical deterioration. Memory devices with hard errors experience consistently incorrect results (e.g., bit always 1 or 0). Soft errors or transient faults occur when charged particles such as alpha particles or cosmic rays penetrate a memory cell and cause a bit(s) to flip or change states. Memory disruptions caused by soft errors are quantified as a soft error rate (SER). Soft errors are somewhat random events, however the SER can vary exponentially according to, among other things, the proximity of a device to a radioactive source and the altitude at which the device operates.

No matter what the type or cause, memory faults are generally unacceptable. In certain situations, a memory error that causes a bit to change states will be almost insignificant. For instance, if one bit in a single screen shot that appears for a spit second is off (rather than on) such an error will often go unnoticed. However, if a single bit is flipped in a router application it may mean the difference between a message going to Boston and a message going to San Francisco. Furthermore, small errors in military and mission critical systems could cause catastrophic damage to life and property.

To compensate for errors and improve the reliability of memory devices even as feature sizes decrease, a multitude of error detection and correction techniques need to be employed. However, utilizing conventional error detection and correction techniques can significantly impact system performance in part because the central processor in a computer system needs to be diverted from other processes to test and correct a memory device. Furthermore, the period of time that the processor is diverted from other processes varies proportionally with the amount of memory utilized on a platform. This is problematic, as more and more software applications require an increasingly large amount of RAM to store and execute programs. Moreover, conventional systems only test the memory upon start-up, prior to booting a machine, thus delaying system startup in proportion with the amount of system RAM and ignoring errors the may arise during system operation. Therefore, there is a need for a system and method of testing, correcting, and compensating for errors that does not significantly delay machine startup and which can continuously test for and correct errors while a system is operating.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with one aspect of the present invention a random access memory (RAM) device which can self-test and self-correct memory errors is provided. The RAM device or card contains a memory array and an embedded self-testing RAM interface which contains appropriate logic or a microprocessor that facilitates testing of the memory array. The unique architecture of the present invention frees a central processing unit (CPU) from having to execute tedious memory testing algorithms on a large amount of data. According to one aspect of the invention, the self-testing RAM can execute all the tests that would conventionally need CPU intervention. According to another aspect of the invention, the CPU and the self-testing RAM interface can cooperate and testing duties can be divided among both the CPU and the self-testing RAM interface in an optimal fashion.

Testing of memory can vary in complexity depending on the nature of the test and the allotted time for test completion. As describe supra, conventionally a computer boot process is delayed in proportion to the amount of RAM on the platform. The present invention, however, can mitigate or even eliminate the conventional start up delay without having to forgo RAM testing (e.g., quick boot). By dividing testing duties between the CPU and the self-testing RAM device start-up times can be cut in half or more. Further yet, according to another aspect of the invention, upon system start-up the self-testing RAM interface can effectuate all the testing procedures and make portions of RAM available to the CPU, concurrently running the boot process, in real-time after it is tested.

Further to another aspect of the invention, the CPU to memory interface can be tested utilizing the self-testing RAM. In brief, the CPU can load a test pattern and write it to memory. The testing component, being aware of the test pattern, can thereafter read the memory and notify the CPU if there were any errors.

In accordance with yet another aspect of the present invention, the self-testing RAM can continuously test and correct for memory errors during system operation. Conventionally, after being delayed significantly at start-up for testing no further RAM testing is done. Such a testing scheme is completely inadequate as it does not account for either hard or soft errors that can materialize during operation from such causes as electromigration or background radiation. Alternatively, the subject invention, according to one aspect, provides for continuous testing and error correction utilizing a self-testing RAM interface. Data can be read from various addresses and tested for accuracy using error correction code (ECC) and/or comparing the data with other data copies (e.g., data storage device, cache . . . ). If errors are detected then the data can be corrected employing EEC and voting mechanisms and writing a correct copy of the data to the data address.

According to a further aspect of the subject invention the self-testing RAM device can detect and compensate for hard errors. Hard errors result when a memory cell is physically incapable of maintaining data integrity. By keeping track of the number of times a memory cell has stored erroneous data the self-testing RAM interface can detect the existence of a hard error. Upon detection of a hard error, the self-testing RAM interface can map the defective cell or cell addresses to another properly functioning cell or cells in an area which the self-testing RAM interface reserves specifically for such errors.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system," and "interface" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
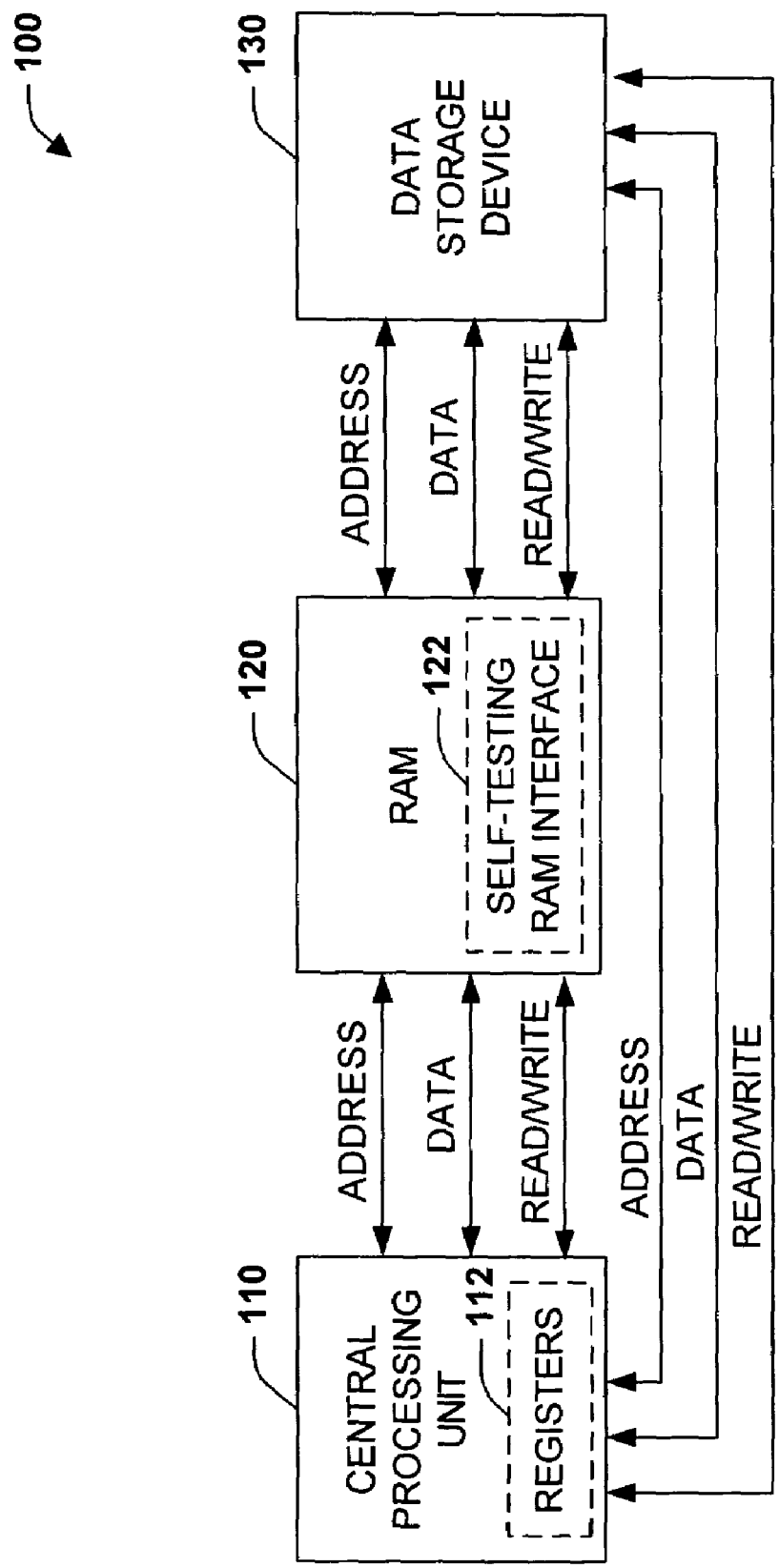
FIG. 1 is a block diagram of a self-testing RAM system in accordance with an aspect of the present invention.

Turning initially to FIG. 1, a self-testing RAM system 100 is illustrated in accordance with an aspect of the present invention. System 100 comprises a central processing unit (CPU) 110, registers 112, random access memory (RAM) 120, self-testing RAM interface 122, and data storage device 130. The CPU 110 has registers 112 within the chip or in close proximity thereto to provide very fast-localized cache memory (e.g., L1, L2) to the processor. CPU 110 is connected via address lines and data read/write lines to RAM 120 and data storage device 130. The CPU 110 can receive data or instructions by specifying an address on the address line and receiving the data or instructions on the data read/write line. Typically, the CPU will first request the data from RAM 120 (if the data is not already in the CPUs registers) because the data is available faster on RAM than on a data storage device 130. However, if the data is not currently stored in RAM 120, the processor will request and received the data from data storage device 130. A similar type of process can be employed by the CPU 110 during a write operation. During a write operation the CPU 110 can write data to one or both of RAM 120 and data storage device 130. RAM 120 generally corresponds to random access memory as is known in the art. RAM 120 is one level lower on the memory hierarchy than CPU cache memory and stores copies of data stored from CPU registers 112 and/or memory device 130 to facilitate high-speed data access. Furthermore, it is to be appreciated that RAM 120 includes all types of random access memory including but not limited to dynamic random access memory (DRAM), static random access memory (SRAM), synchronous dynamic RAM (SDRAM), Rambus DRAM (RDRAM), extended data-out DRAM (EDO RAM), double data rate SDRAM (DDR SDRAM), enhanced SDRAM (ESDRAM), Synchlink DRAM (SLDRAM), direct Rambus RAM (DRRAM), video RAM (VRAM), magnetic RAM (MRAM), and ferroelectric RAM (FRAM). Unlike conventional RAM devices, however, RAM 120 contains self-testing RAM interface 122. Self-testing RAM interface 122 can perform a variety of different tests via hardware, software, or a combination thereof to determine the existence of an error (e.g., hard or soft) in RAM 120 and correct or compensate for such an error if found. Self-testing RAM interface 122 can be an autonomous component or it can interact and collaborate with CPU 110 to test the RAM 120. Error testing (described in detail infra), can include testing prior to or simultaneous with initiation of a boot procedure such as writing a pattern to RAM 120 and reading each memory cell or a subset of memory to ensure bits are properly stored. Error testing can also be performed continuously with system operation. One example of such test would be verifying that the data copied to RAM 120 from storage device 130 or registers 112 has been copied or written correctly. Data storage device 130 is typically a rung down the memory hierarchy from RAM 120. For purposes of this specification, data storage device 130 is intended to correspond to a device for storing large quantities of data. Typically, data storage device 130 is a disk drive, however this invention is not so limited and can include any an all high-density data storage devices (e.g., flash, organic memory media . . . ). Furthermore, it should be noted that the data storage device can be other RAM devices.

Figure 2:
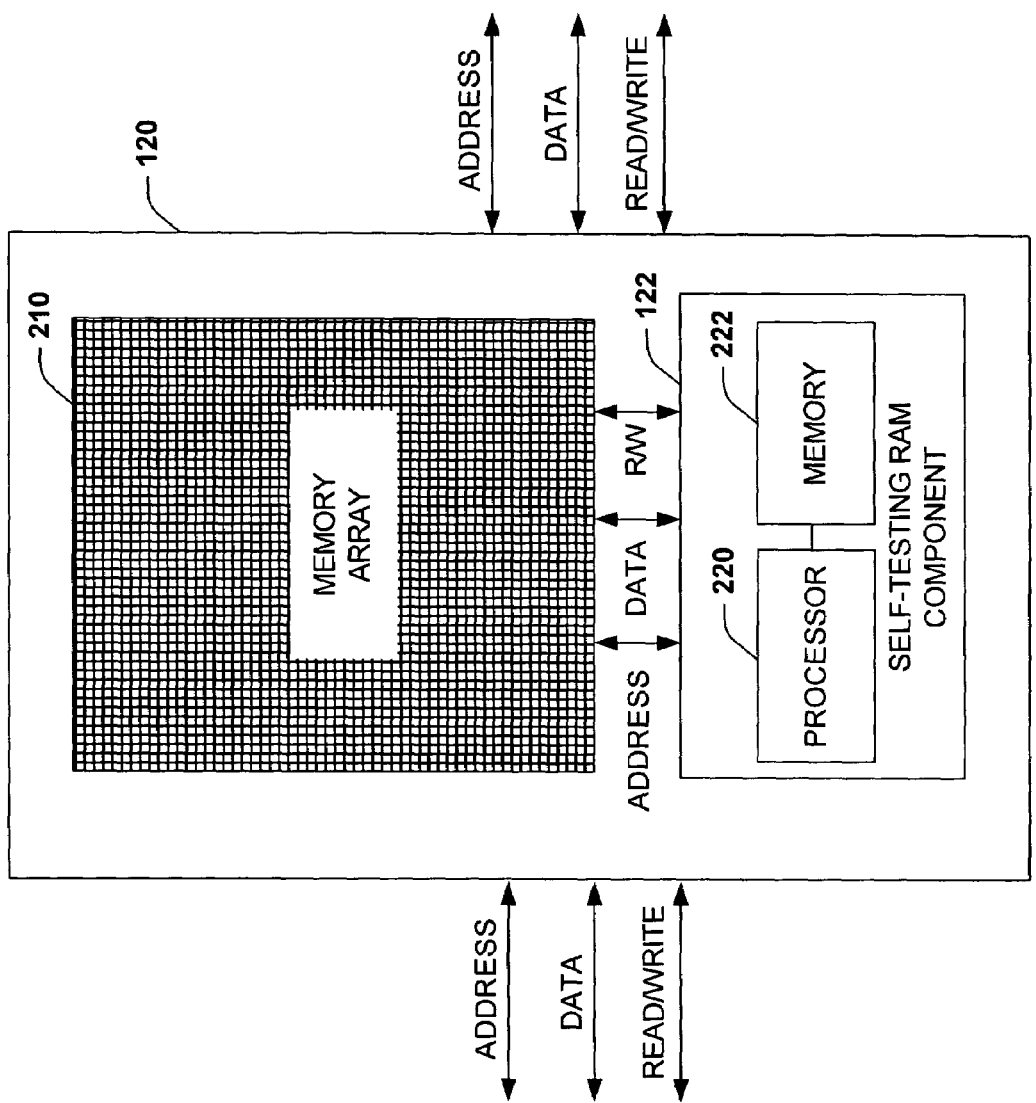
FIG. 2 is a schematic block diagram illustrating a self-testing RAM device in accordance with an aspect of the present invention.

FIG. 2 is a schematic block diagram illustrating self-testing RAM device 120 in accordance with an aspect of the present invention. RAM 120 includes memory array 210, self-testing RAM interface 122, processor 220, and memory 222. Memory array 210 stores a multitude of data bits in a two dimensional matrix of cells such that the bits are addressable by row and column (a/k/a bit line and word line). Accordingly, to write a memory cell a processor (e.g., CPU or processor 220) can activate a column and apply a charge to a desired row. To read a memory cell the processor can select a column and detect the charge at a particular row. If there is no charge, the bit can be expressed as a 0 and if there is a charge above a certain threshold, the bit can be expresses as a 1 or vice versa. Furthermore, a memory array can contain additional bits of memory that are not used for data storage but rather for error detection and/or correction (e.g., parity bits, hamming code bits . . . ). Self-testing RAM interface 122 comprises a processor 220 in accordance with the present aspect of the invention. Processor 220 is embedded within RAM 120 and adds intelligence and control to a RAM 120, which conventionally is a simple passive device. Processor 220 is associated with memory 222. Processor 220 employs memory 222 to facilitate program execution for instance by storing program variables, programs, and/or data. Memory 222 can be an additional memory located within self-testing RAM interface 122 (as shown), such as processor cache memory. Memory 222 can be implemented with larger geometry features, for example, which make it less susceptible to hard or soft errors than memory array 210. Alternatively, memory 222 can be can be located in memory array 210, or external to the RAM 120 (e.g., on a disk drive, flash memory . . . ). Furthermore, it should be noted that processor 220 can be utilized to execute a plurality of error detecting and correcting algorithms to increase the reliability of the data stored in RAM 120. Still further yet, it should be appreciated that the components implementing the STRAM subsystems of 122 (FIGS. 1, 2, and 3) can be implemented using much faster technology components than conventional devices of 340,342,344, such as Gallium Arsenide vs. standard silicon based devices respectively. According to one aspect of the present invention, processor 220 can load a bit pattern (e.g., checkerboard) in the memory array 210 and verify that each cell contains the expected bit. Such a memory checking procedure can be employed on start-up of a computer system, for example. By enabling RAM 120 to test itself, a computer's CPU 110 is free to continue executing other tests and/or boot procedures thereby facilitating high-speed start-up with error checking. Furthermore, processor 220 need not operate solely by itself. The processor 220 can cooperate with the CPU 110 (FIG. 1) in running error-testing procedures. Thus, with respect to the above described memory testing procedure, the processor 220 and CPU 110 could divide the memory in half (or any other percentage), each writing and reading from one half of the memory to enable a comprehensive memory check to be completed more rapidly. Alternatively, the CPU register to RAM interface can be tested by loading a preconfigured pattern into registers 112 (FIG. 1) and writing them out to RAM 120. The processor 220 could subsequently verify whether the pattern written to RAM 120 is correct. Furthermore, the processor 220 can solely or in cooperation with CPU 110 execute conventional error correction code on the memory array 210, which is a task traditionally left to the CPU and an associated memory management component. In addition, processor 220 can execute a continuous data/address verification process while the computer system is running to improve RAM 120 reliability. Such a process (described in further detail below) can include reading data from memory array 210, retrieving a copy of the data from a data storage device such as a disk drive, or other RAM device, for example, and ensuring the data has been correctly stored in memory array 210 by comparing the data with a copy of the data stored at a corresponding address on the disk drive. Rather than accessing a disk to compare data, error detection could also be performed using a error correction code to determine whether the data has been correctly stored by referring to additional bits in memory array 210 that describe correct data (e.g., parity bits). Furthermore, it should be noted that if an error is detected the processor 220 can notify the CPU (e.g., bus fault, non-maskable interrupt, maskable interrupt) and/or correct or compensate for the error.

If an error is determined by the processor 220 to be a hard error (physically defective cell) such that the processor 220 cannot simply correct the erroneous data, then the processor can compensate for the memory error. Compensating for an error can be accomplished by mapping the erroneous cell or group of cells to a new location. For example, processor 220 can receive and/or dedicate a certain quantity of memory in memory array 210 to be used to compensate for bad cells which cannot consistently and reliably store data. The processor 220 can then maintain a list of bad cells and their new mappings such that if such memory address is requested by the CPU 110 the CPU can be, according to one aspect of the invention, rerouted to the new location of the desired memory.

Figure 3:
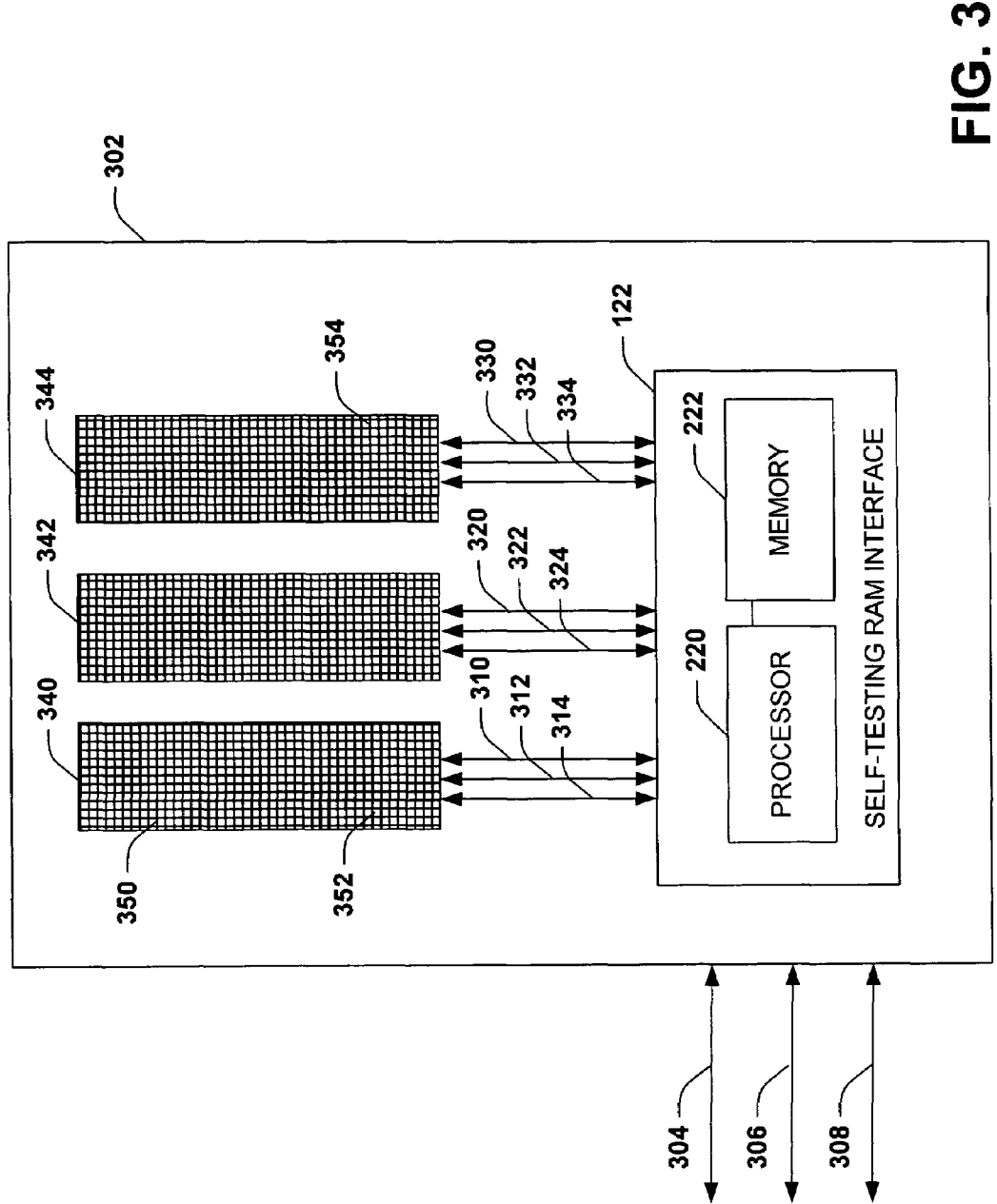
FIG. 3 is a schematic block diagram illustrating self-testing RAM device accordance with an aspect of the present invention.

FIG. 3 is a block diagram depicting a standalone self-testing RAM (STRAM) self-validating (SVRAM) device 302. Device 302 comprises address line 304, data bus 306, read/write line 308, self-testing RAM interface 122, processor 220, memory 222, address lines 310 320, and 330, data buses 312, 322, and 332, read/write lines 314, 324, and 334, memory stores 340, 342, and 344, and memory cells 350, 352, and 354. Self-testing RAM interface 122 includes processor 220 and memory 222. Processor 220 employs memory 222 to facilitate program execution for instance by storing program variables, programs, and/or data. Memory 222 can be an additional memory located within self-testing RAM interface 122 (as shown), processor cache memory, or memory 222 could be external to the processor 220 and self-testing RAM interface 122. Furthermore, it should be appreciated that memory 222 can be implemented with larger geometry features, for example, in order to make it less susceptible to hard or soft errors than internal memory stores 340, 342, and 344. Still further yet, it should be appreciated that the components implementing the STRAM subsystems of 122 (FIGS. 1, 2, and 3) can be implemented using much faster technology components than conventional devices of 340,342,344, such as Gallium Arsenide vs. standard silicon based devices respectively. Self-testing RAM interface 122 can be electrically connected to the address line 304, data bus 306, and read/write control line 308 of a typical central processing unit (CPU) 110 (not shown). The CPU 110 can make requests to read/write data through the interface provided by 304, 306, and 308 as it would with conventional RAM devices. When the self-testing RAM interface 122 receives the address read request via address line 306 and read/write line, for example, it can internally decode this request using processor 220 and memory 222. The processor 220 and the memory 222 can then provide the mechanism to drive multitude of address lines 310, 320, and 330, data busses 312, 322, and 332, and read/write control 314, 324, and 334 associated with a plurality of memory arrays or stores 340, 342, and 344. The memory stores 340, 342, and 344 provide storage for one or more copies of the data in different locations providing robustness against radiation induced soft errors for example. Self-testing RAM interface 122 can then gather mapped data from cells 350, 352, and 354, for instance, and perform ECC computations to validate the data to be placed on data bus 306 to be transferred to a requesting CPU.

Self-testing RAM interface 122 in accordance with an aspect of the subject invention can be employed as a virtual memory manager and a memory paging mechanism. Accordingly, it should be noted that during initial system startup while self-testing RAM interface 122 is testing the memory of memory store 344, self-testing RAM interface 122 can map all address/data accesses by the CPU 110 to memory cells provided by memory stores 340 and 342 which are not in the process of being tested. Thus, the actual amount of physical storage may therefore increase moments after system startup as the additional memory stores come online. Self-testing RAM interface 122 can also perform RAM cell testing without CPU 110 interventions by mapping all present live data and address line 304 and data bus 306 access to memory stores 340 and 342 while using self-testing RAM interface 122 to test the memory cells such as cell 354 in memory store 344.

Furthermore, it is to be appreciated that self-testing interface 122 can be employed to support multiple or dual port access. Dual-port access refers to the ability of a memory device to support simultaneous read and write access to the memory. According to an aspect of the present invention multiple instances of self-testing interface 122 can be run simultaneously to support multi-port memory access.

Existing RAM devices have a typical 1:1 mapping between address and data lines shown by address line 304 and data bus 306 and the respective mapping to a RAM device single storage medium represented by memory storage 340, 342, and 344. The employment of several memory locations and representative storage mediums to provide robustness of the data store is one of several aspects of the present invention.

According to yet another aspect of the present invention the functionality of self-testing RAM interface 122 can be implemented as a standalone interface device which provides a virtual mapping from a single address and data bus interface (304 and 305) to a multidimensional data store. Additionally, multiple location stores providing a more robust implementation contained by a plurality of memory stores 340, 342, and 344 could be implemented using conventional existing RAM devices (e.g., single in-line memory module (SIMM) dual in-line memory module (DIMM) . . . ). Moreover, the memory stores 340, 342, and 344 can contain internal flaws that would conventionally be rejected for use in any system. The redundancy and defective cell remapping of the present invention creates a non-zero utility value for these otherwise useless devices. For example, assume that two 256 MB RAM devices each have 50% defective row/column errors found during a manufacturing test. Legacy systems could not use these devices unless the faults were contiguous. However, the self-testing and self-validating system of the present invention can utilize the self-testing RAM interface 122 to provide nearly 256 MB of combined functional RAM. Therefore, the added value of self-testing RAM interface 122 allows existing CPU architectures to use lower yield RAM devices that would currently be rejected and discarded.

In addition the functionality provided by self-testing RAM interface 122 in can be implemented in several manners in accordance with various other aspects of the subject invention. First, self-testing RAM interface 122 can be implemented employing a processor 220 and a memory 220 as described supra. Alternatively, the processor and memory could be replaced with logic comprises any means of embedding autonomous self-testing and/or cooperative testing onto RAM 120 or 302. Examples of such logic include but are not limited to gate arrays, integrated circuits, and firmware. Furthermore, the self-testing RAM interface 122 could be implemented as an advanced memory interface in a CPU (e.g., SoC (System on Chip) design. Still further yet, it should be appreciated that the interface components of STRAM devices 120 and 302 (FIGS. 1, 2, and 3) can be implemented using Gallium Arsenide technology rather than standard silicon based technology to provide much faster operation than conventional devices.

Figure 4:
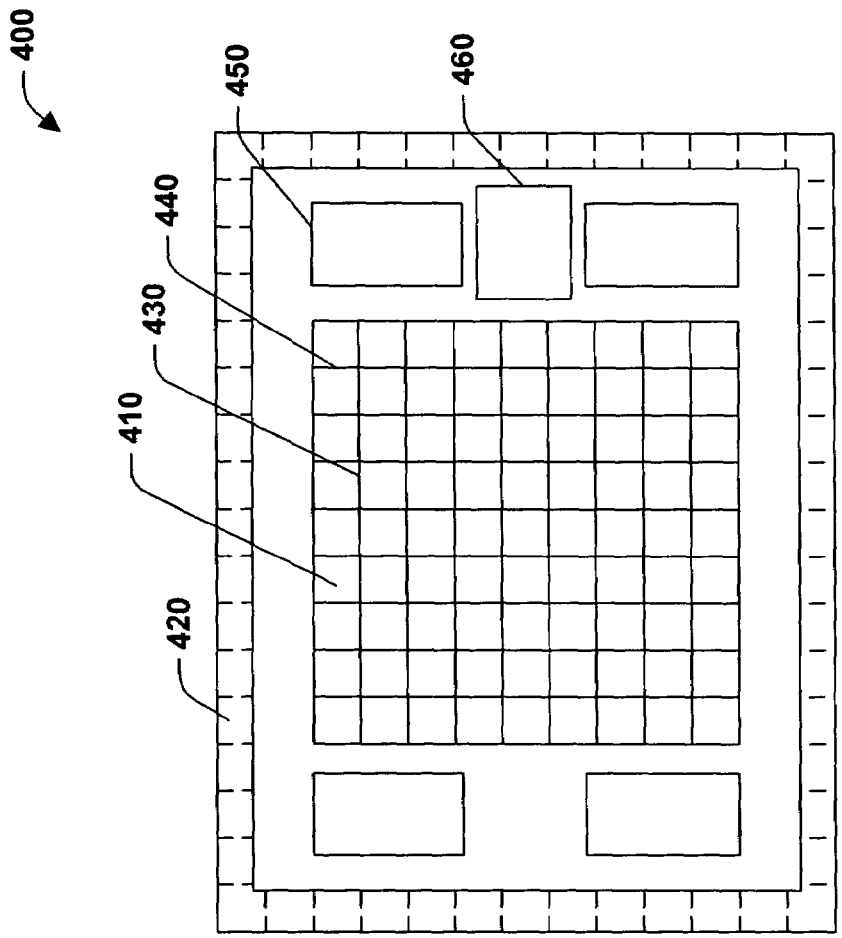
FIG. 4 is an illustration of a field programmable gate array employing self-testing RAM in accordance with an aspect of the present invention.

FIG. 4 illustrates a block diagram of an alternative system environment in which the present invention can be employed. The present invention has thus far be described and will be hereinafter illustrated in conjunction with a computer system, however, it should be appreciated that the subject invention is not so limited. Self-testing RAM can be employed where ever and at any level of technology where RAM is utilized. FIG. 4 depicts a field programmable gate array (FPGA) 400. FPGAs are digital integrated circuits that may be programmed by a user to perform logic functions. FPGA 400 includes an array of configurable logic blocks (CLBs) 410 that are programmably interconnected to each other and to programmable input/output blocks (IOBs) 420. The interconnections are provided by an interconnect array represented as horizontal and vertical interconnect lines 430 and 440. This collection of configurable elements and interconnects can be customized by loading configuration data into the FPGA via RAM blocks 450 which define how the CLBs, interconnect lines, and IOBs will function. The configuration data can be read from memory (e.g., an external PROM) or written into FPGA 400 from an external device (e.g., computer). An interesting aspect of FPGAs is that that are reprogrammable at least because the CLBs employ static RAM cells. In accordance with an aspect of the subject invention it should be appreciated that FPGA 400 can also include self-testing RAM interface 460 which can be utilized to test CLBs 410 and RAM blocks 450 for errors and improve the overall reliability of FPGA 400. In one instance, self-testing RAM interface 460 can read and write data to memory cells prior to programming to ensure proper functioning of all memory cells. Self-testing RAM interface 460 can also be employed in another instance to verify stored data is correct by utilizing a plurality of error detection and correction algorithms and/or retrieving copies of the data to compare with the stored data.

It should be appreciated that the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

In view of the exemplary systems described supra, a methodology that may be implemented in accordance with the present invention can be better appreciated with reference to the flow charts of FIGS. 5-11. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Figure 5:
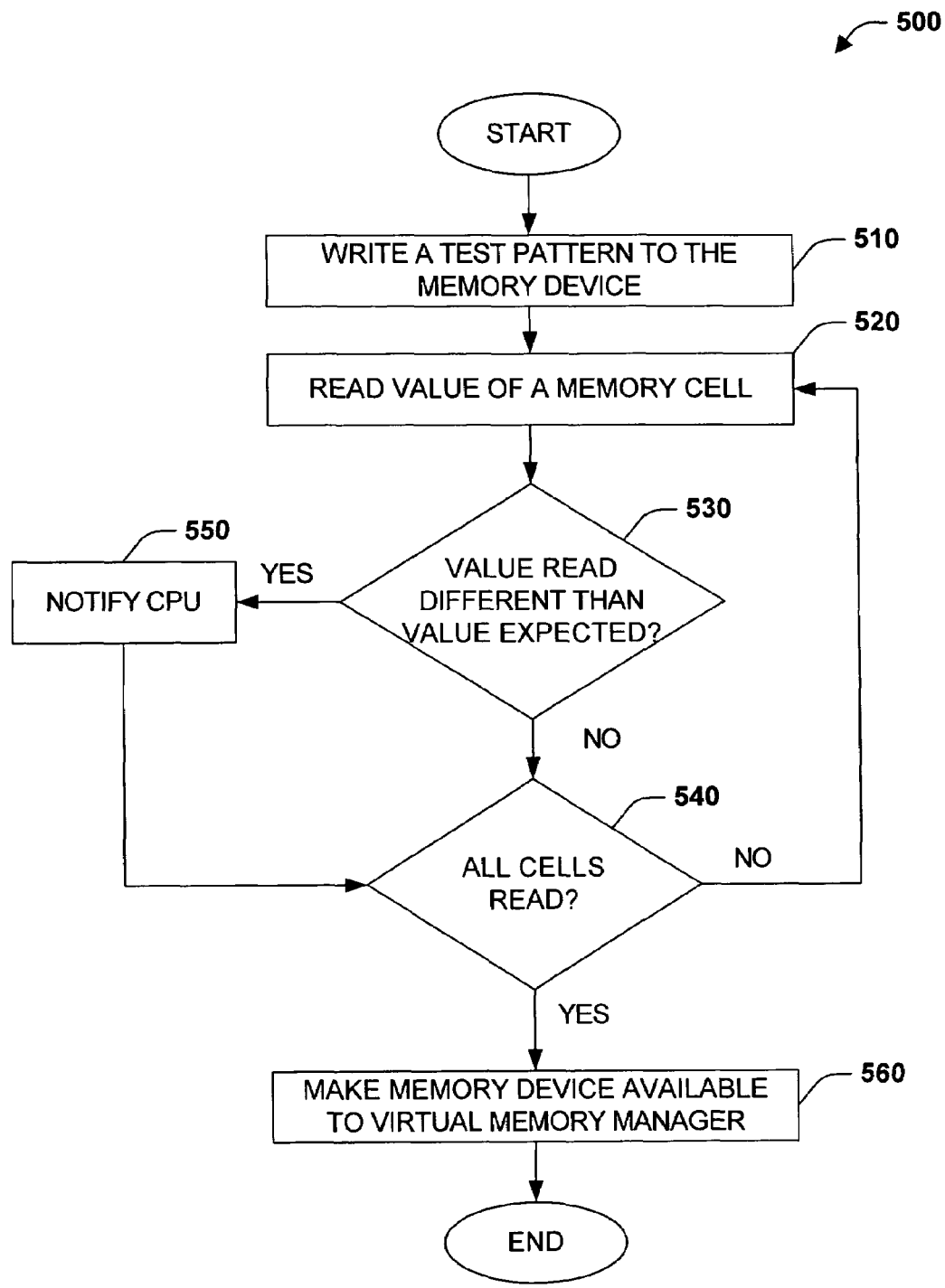
FIG. 5 is a flow chart diagram depicting a memory testing methodology in accordance with an aspect of the present invention.

Turning to FIG. 5, a methodology 500 for performing a memory test in accordance with an aspect of the present invention depicted. Method 500 is employed according to one aspect of the invention upon system start-up so as to reduce the conventional start-up delay without having to forgo memory testing. At 510 a test pattern (e.g., checkerboard, 10101010101) is written to all or part of a memory device (e.g., memory array 210) by a self-testing RAM interface 122. The test pattern can be stored within or generated by the self-testing RAM interface 122 (e.g., cache or memory) or retrieved from an external medium. At 520, a memory cell value is read by the self-testing RAM interface 122. Subsequently the value read is compared with the expected value, corresponding to the pattern written, to determine if the values are different at 530. If the value expected is not different than the value read then the process continues at 540. At 540, a determination is made as to whether all the cells in the tested memory have been read. If all the cells have not been read the method proceeds to read another memory cell at 520. According to one exemplary method this could be accomplished by incrementing the memory address read by one such that the next contiguous memory cell can be read. Turning back to 530, if the value expected is different than the value read at 520 then the process continues at 550. At 550, the self-testing RAM interface 122 notifies (e.g., generating memory fault or interrupt) CPU 110 (FIG. 1) that an error the memory device exists. The CPU 110 can then decide how to proceed. The CPU 110 may decide that the error is insignificant and ignore the notification. However, if the CPU 110 determines that the error is significant it could notify the user and either shut the system down, refuse to start a boot procedure, or refuse to continue with the boot procedure if it is currently being executed. After the processor is notified the process continues at 540 where a determination is made as to whether all the memory cells have been read. If all memory cells have not yet been read the procedure continues at 520 where the next memory value is read. If all cells have been read then in accordance with an aspect of the invention the memory device or memory bank being tested is brought on line and made available to the RAM interface 122 functioning as a virtual memory manager as described supra. In addition, while this method has been described with respect to the self-testing RAM interface 122 performing all the testing it is to be appreciated that the CPU 110 and the self-testing RAM interface 122 could test the memory simultaneously to increase the overall speed of the testing procedure. For example, the CPU could test the first half of the memory while the self-testing RAM interface examines the last half of the memory.

Figure 6:
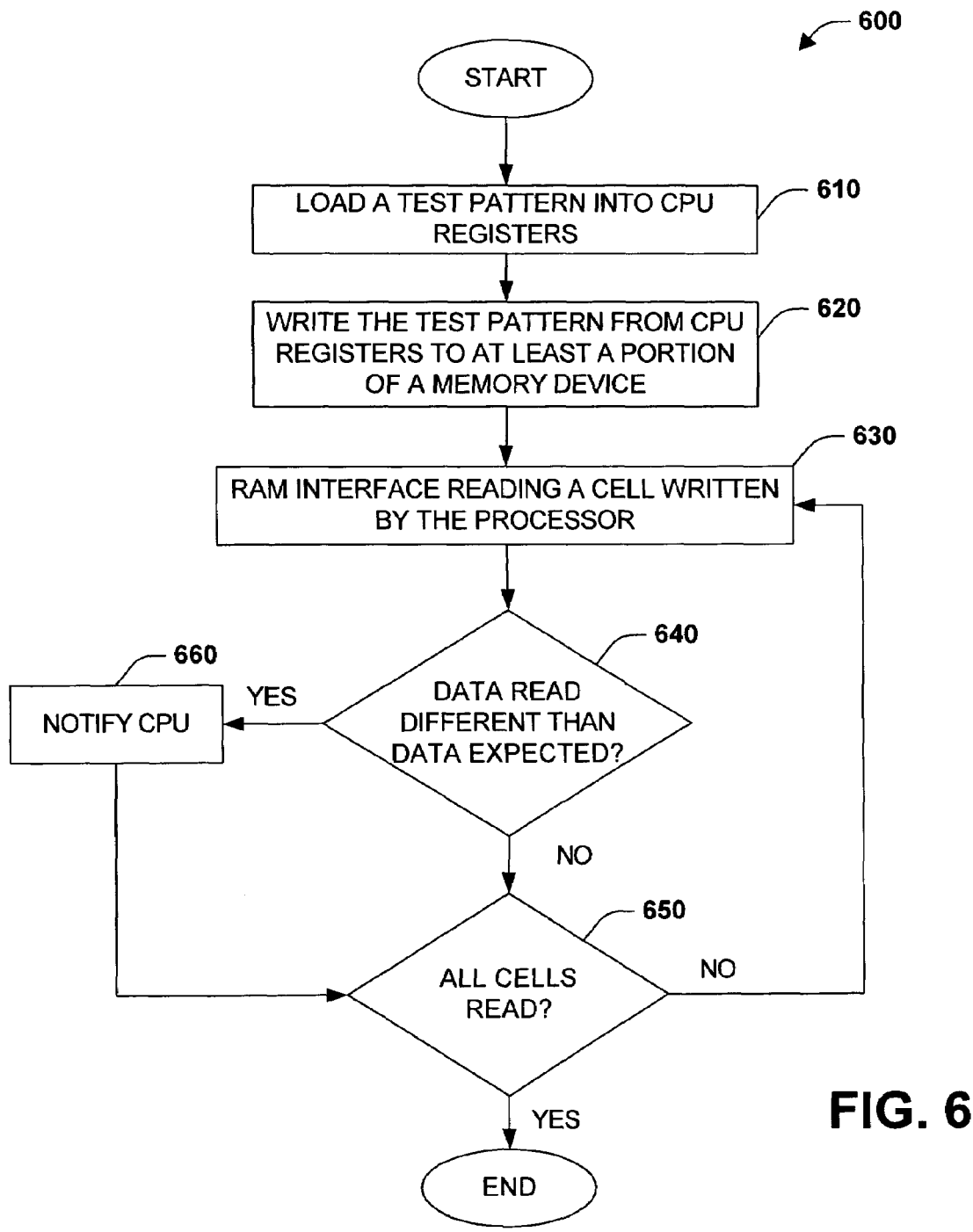
FIG. 6 is a flow chart diagram illustrating a method of verifying a processor to memory interface in accordance with an aspect of the present invention.

FIG. 6 is a flow chart diagram of a method 600 for testing a processor to memory interface. At 610, CPU registers are loaded with a preconfigured test pattern. The CPU then writes the test pattern to at least a portion of memory (e.g., pre-selected memory addresses), at 620. At 630, a self-testing RAM interface reads a cell written by the CPU 110. The value is then compared with the value the self-testing RAM interface expected to read according to the preconfigured test pattern at 640. If the value read is not different than the value expected then the process continues at 650. If the value read is different than the value the self-testing RAM interface expected then at 660 the CPU 110 is notified (e.g., bus fault, interrupt). The process continues at 650 where a determination is made as to whether all the cells written by the CPU 110 have been read and verified or not. If all the cells have been read the procedure terminates. However, if all the cells have not yet been read and verified then the process continues at 630 where another cell written by the CPU 110 is read.

Figure 7:
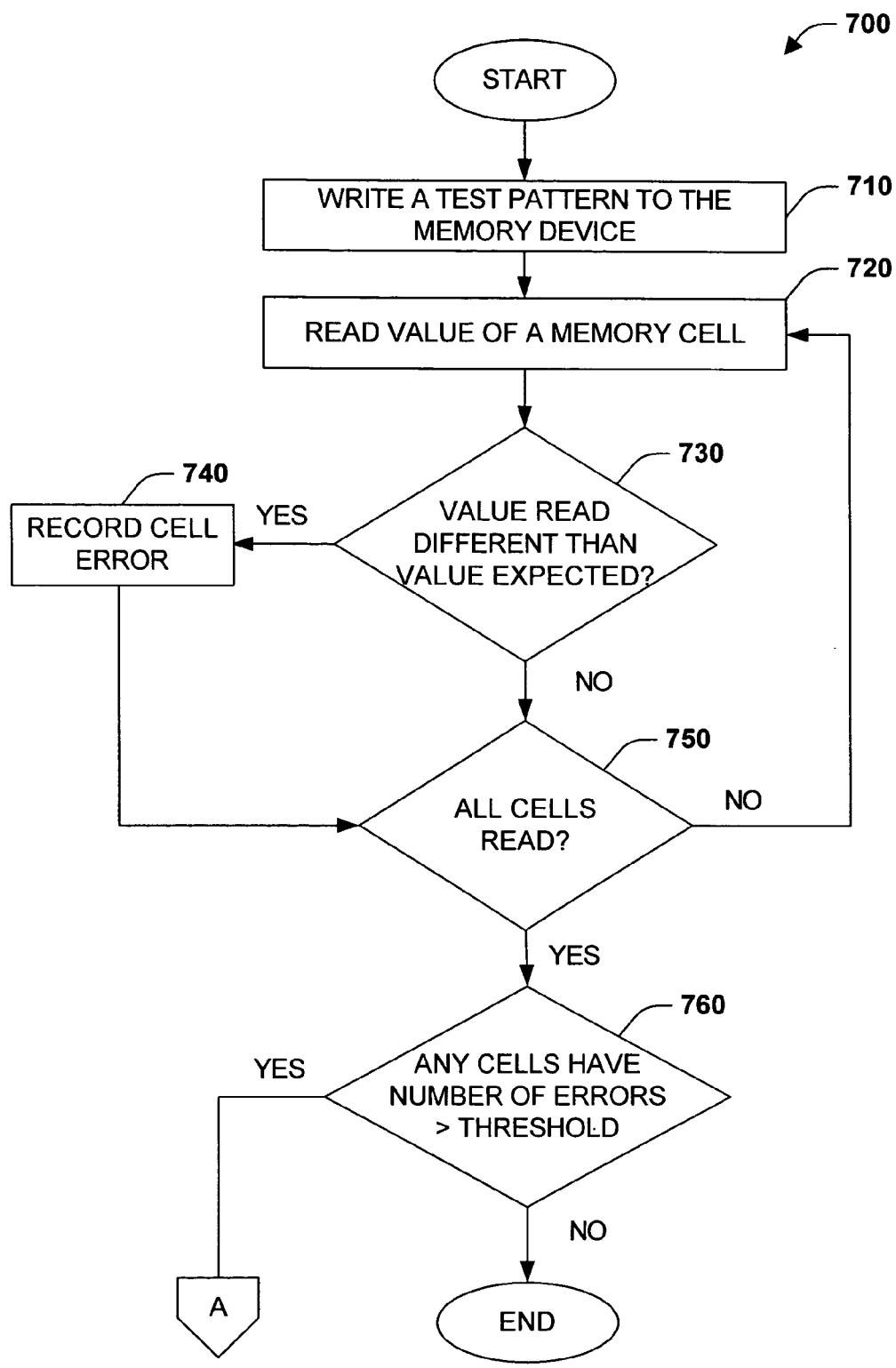
FIG. 7 is a flow chart diagram depicting an error detection and correction methodology in accordance with an aspect of the present invention.
Figure 8:
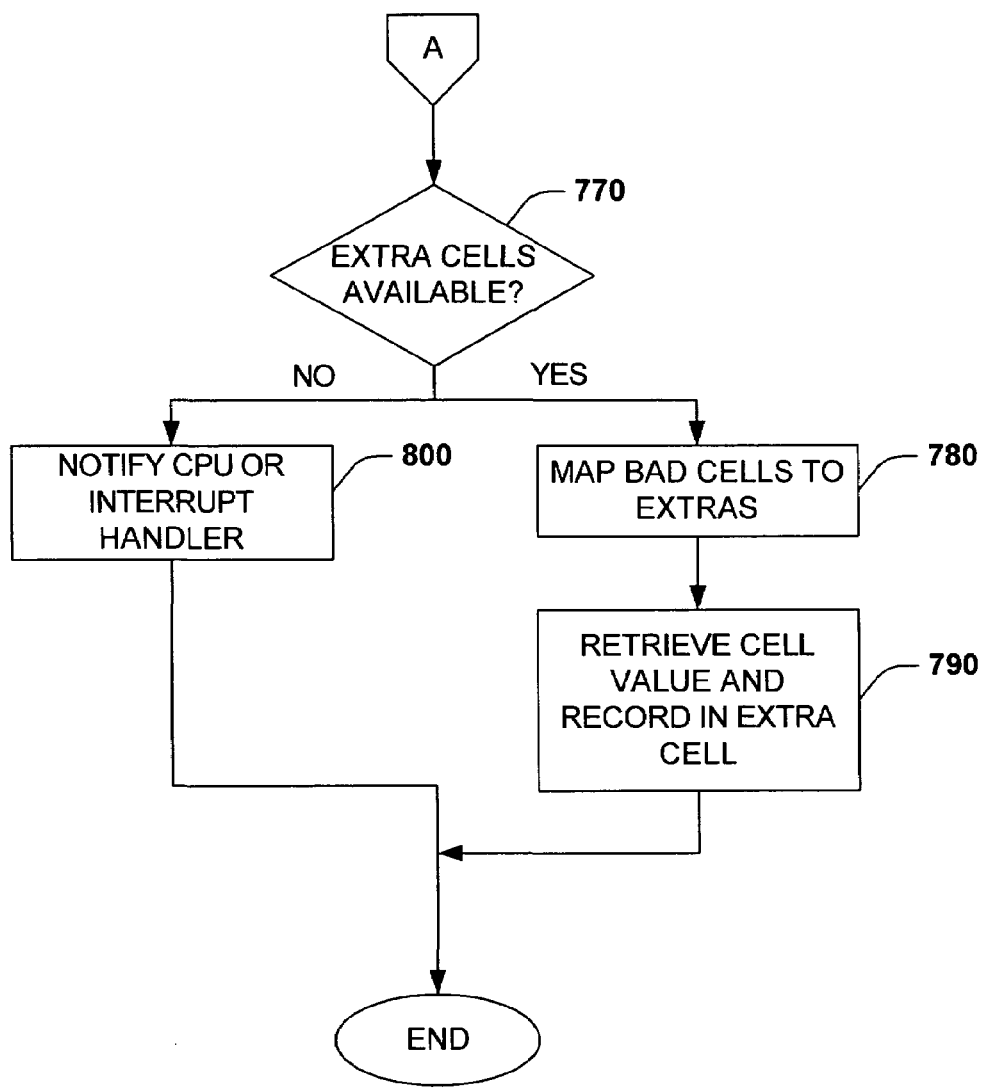
FIG. 8 is a flow chart diagram continuation of FIG. 7 in accordance with an aspect of the present invention.

FIG. 7 is a flow chart diagram of a methodology 700 for detecting and compensating for errors in a random access memory in accordance with an aspect of the subject invention. At 710, the self-testing RAM interface 122 writes a data test pattern (e.g., checkerboard, 1010101010) to the at least a portion of a memory device. Next a memory cell is read at 720. Subsequently a decision is made as to whether the value read at a particular memory location corresponds to the value that was or should have been written to the location by the self-testing RAM interface 122 at 710. If the value is different than expected the self-testing RAM interface 122 records in a table of errors the address of erroneous cell at 740 or increments a counter associated with the address at which an error was detected and continues at 750. If the value is not different than what was expected the process also continues at 750. At 750, a determination is made as to whether all the memory cells have been read. If no, then the address is incremented and the next memory cell is read at 720. If yes, then the process proceeds to 760 where a determination is made as to whether any cell has faulted more than a threshold number of times (e.g., more than once). This can be achieved by reviewing the table of errors and determining the number of times a cell has produced an error. Such a method enables the self-testing RAM interface to weed out hard errors that occur frequently, if not always, from soft errors that only occur occasionally. If no cells have produced errors more than a threshold number of times than the procedure terminates. If one or more memory cells have produced an error more than a threshold number of times the process continues at 770 in FIG. 8. At 770, a determination is made as to whether extra properly functioning memory cells are available. According to an aspect of the subject invention a portion of memory in RAM can be set aside for error correction or compensation. If there are extra cells available then at 780 the bad or contaminated cell address is mapped to one of the extra cells. At 790, the value of the bad cell is retrieved or corrected and written to the new location. The value of the bad cell may be retrieved utilizing a plurality of methods including but not limited to employing error correction code, retrieving the value form data storage, and retrieving it from CPU cache memory. If extra cells are not available then the CPU or alternatively an interrupt handler (e.g., busmaster/supervisory interrupt handler) is notified at 800 and the procedure is terminated.

Figure 9:
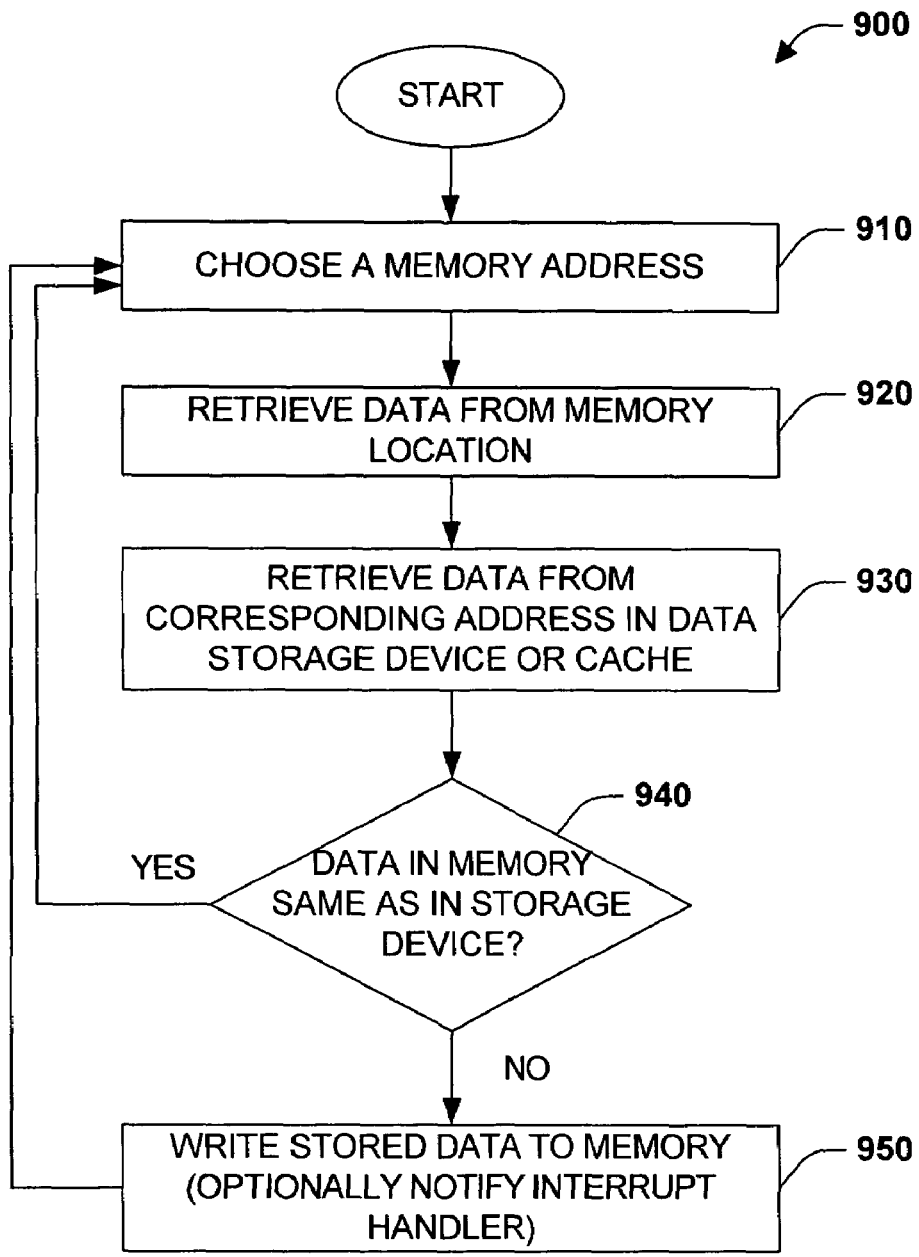
FIG. 9 is a flow chart diagram of a method of memory verification in accordance with an aspect of the present invention.

Turning to FIG. 9, a flow chart illustrating a method 900 of memory verification is depicted in accordance with an aspect of the present invention. At 910, a memory address is chosen by self-testing RAM interface 122 at random or according to a predetermined algorithm. Next, at 920 data is retrieved from the memory location associated with the chosen address. Data corresponding to the chosen memory address is thereafter retrieved by the self-testing RAM interface 122 from a data storage device such as a magnetic disk drive or standard RAM device, or cache memory at 930. Data retrieved from memory is then compared with data retrieved from the data storage device at 940. If the data is the same then the memory is correct and the process proceeds to choose another memory address at 910. If the data is different at 940 then memory integrity has not been maintained and the data from the storage device or cache is written to memory at 950. In addition at 950, the CPU or an exception handler can be optionally notified of the storage error. Subsequently, the process continues at 910 wherein another memory address is chosen for verification. Method 900 can be run continuously during operation of a computer, intermittently when the memory is not being used, or alternatively at the direction of another component such as the CPU 110.

Figure 10:
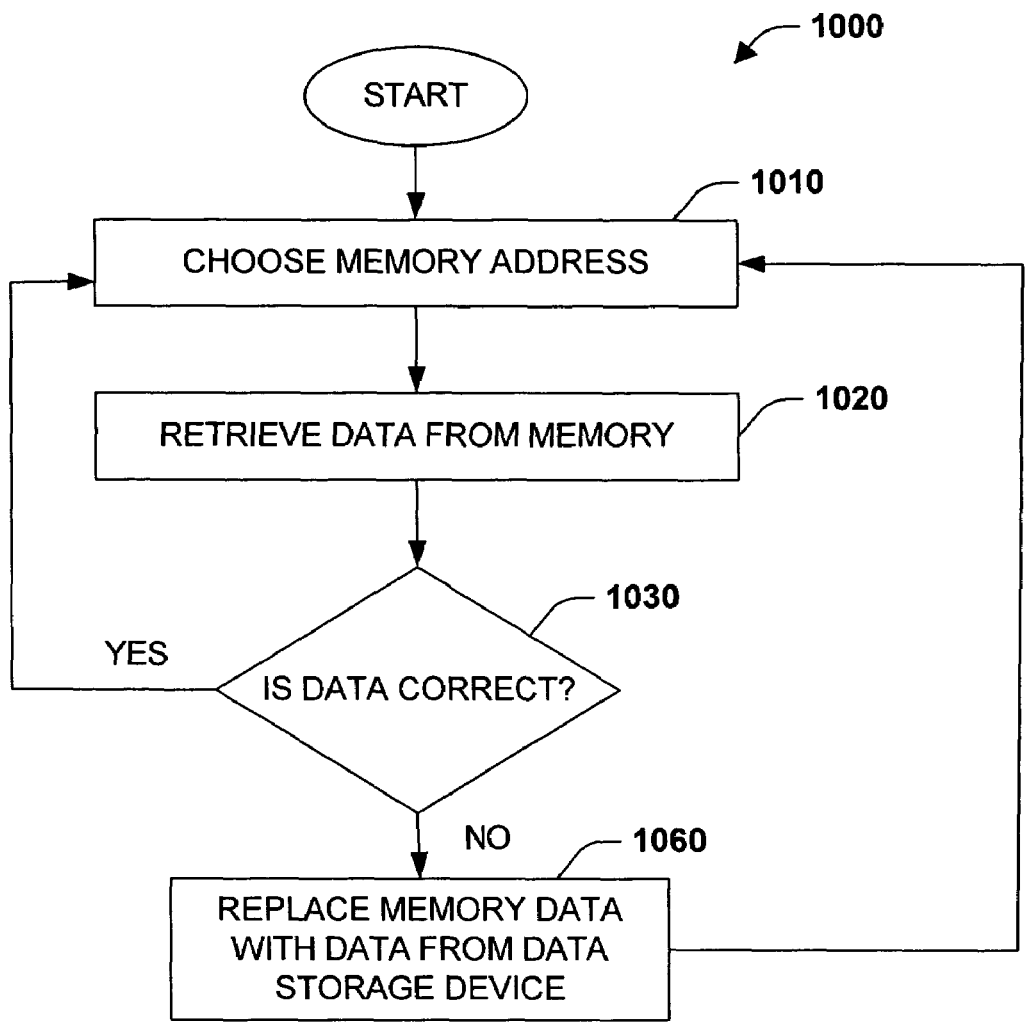
FIG. 10 is a flow diagram depicting a method of maintaining data integrity according to an aspect of the present invention.

FIG. 10 is a flow diagram depicting a method 1000 of maintaining data integrity according to an aspect of the present invention. At 1010, self-testing RAM interface 122 chooses an address to test. Data is retrieved from the chosen memory location at 1020. It should be noted that 1020 is the address request to read a data value located at an address location. Thereafter, at 1030, it is determined whether the data is correct or not. The present invention changes step 1030 from what happens in a legacy system where data is typically retrieved from a single location and imperfect error detection is performed. In the present invention 1030 represents a new process where STRAM provides the physical storage abstraction that makes it possible for 1030 to decode the 1020 address location to actually read data from the possibly several discrete internally mapped addresses, each containing a separate copy or partial representations of the data that is delivered to a new type of ECC and voting mechanisms to determine the most probable data value which should be returned. It is this ECC and voting mechanism that occurs in 1030 based upon several stored copies of the data. The multiple copies in several locations provide more robustness against soft and hard failures than are provided by products known to the present art. Data validity can be checked utilizing additional bits associated with the data and error correction code. At 1030, the self-testing RAM interface implementing error correction code (ECC) determines whether the data is correct. If the data is correct the process continues at 1010 where another address is chosen. If the data is incorrect, the ECC reveals the data error. Thereafter the method continues at 1010 where another address is chosen to be tested. If an error has been revealed the correct data is retrieved from a data storage device (e.g., RAM, disk drive . . . ) or cache by self-testing RAM interface 122. The corrected data thereafter replaces the erroneous data at 1040, and the method proceeds to 1010 where another address is chosen to be tested.

Figure 11:
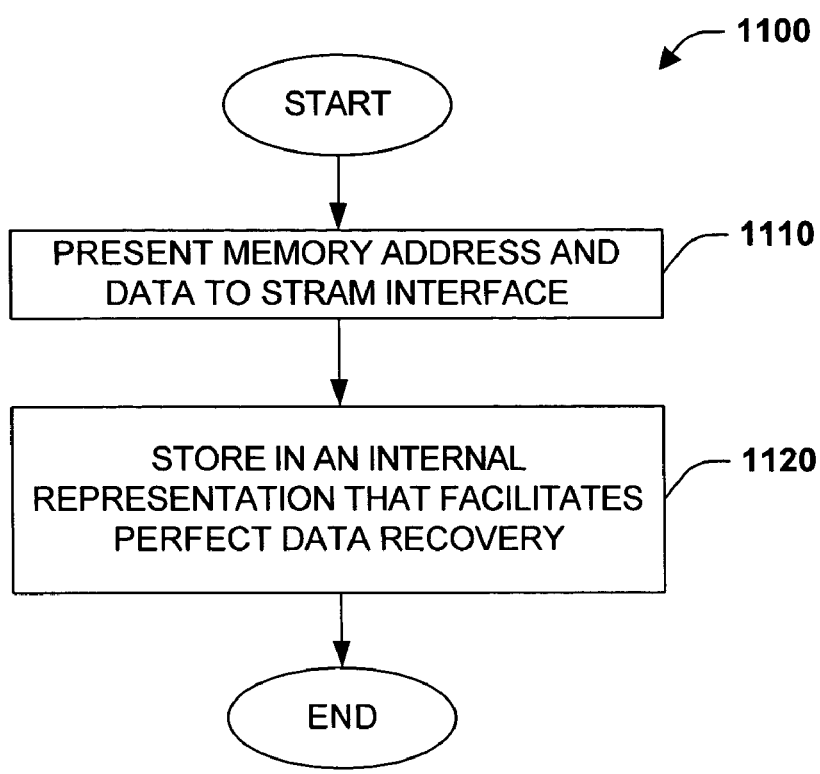
FIG. 11 is a flow chart diagram illustrating the method of writing data to a self-testing RAM device in accordance with an aspect of the present invention.

Turing to FIG. 11, a method 1100 of writing data to memory is depicted. At 1110, the data and address are presented at the STRAM interface. Subsequently at 1120 the data and address are stored according to an internal data representation of the value that facilitates perfect data recovery, such as voting with multiple copies of the data and including ECC for each address written to by operation at 1120. Finally, it should be appreciated that the subject self-testing RAM device(s) support both reading and writing of memory for retrieval and storage of data respectively.

Figure 12:
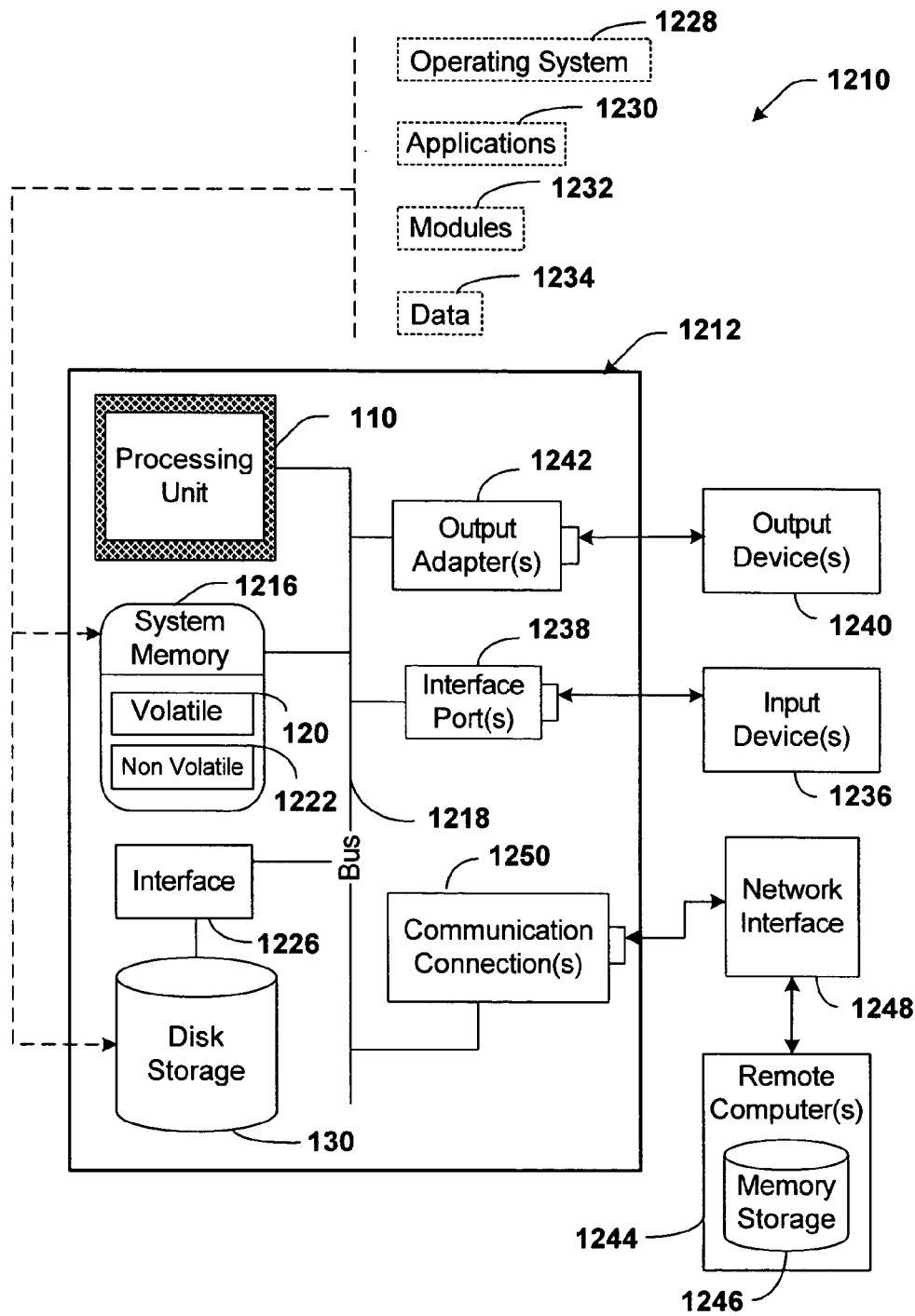
FIG. 12 is a schematic block diagram illustrating a suitable operating environment in accordance with an aspect of the present invention.

In order to provide a context for the various aspects of the invention, FIG. 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand-alone computers. In a distributed computing environment, program modules may be locate in both local and remote memory storage devices.

With reference to FIG. 12, an exemplary environment 1210 for implementing various aspects of the invention includes a computer 1212. The computer 1212 includes a processing unit 110, a system memory 1216, and a system bus 1218. The system bus 1218 couples system components including, but not limited to, the system memory 1216 to the processing unit 110. The processing unit 110 (e.g., CPU) can be any of various available processors. Dual microprocessors and other multiprocessor architectures also can be employed as the processing unit 110.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 120 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 130. Disk storage 130 includes, but is not limited to, devices like a magnetic disk drive, floppy disk drive, tape drive, Jaz drive, Zip drive, LS-100 drive, flash memory card, or memory stick. In addition, disk storage 130 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 130 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 130, acts to control and allocate resources of the computer system 1212. System applications 1230 take advantage of the management of resources by operating system 1228 through program modules 1232 and program data 1234 stored either in system memory 1216 or on disk storage 130. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A self-testing random access memory (RAM) system for a computer, comprising:
   a memory array;
   a self-testing RAM interface that includes a microprocessor, the self-testing RAM interface is embedded on a circuit board with the memory array and tests integrity of data stored in the memory array;
   the self-testing RAM interface with the memory array and a central processing unit (CPU) of the computer are formed on separate integrated circuits and the self-testing RAM interface cooperates with the CPU to facilitate testing memory array data cells by dividing the memory array, so that each of the CPU and the microprocessor concurrently test the array thus facilitating faster testing of the memory array.

2. The system of claim 1, the self-testing RAM interface interacts with the central processing unit (CPU) to test the CPU to memory interface.

3. The system of claim 1, the self-testing RAM interface can correct errors in data stored in the memory array.

4. The system of claim 3, the self-testing RAM interface corrects errors by replacing erroneous data with redundant data stored in the memory array.

5. The system of claim 1, the self-testing RAM interface includes a memory component that facilitates execution of testing and/or correcting algorithms.

6. The system of claim 1, the self-testing RAM interface is implemented with discrete logic.

7. The system of claim 1, the self-testing RAM interface is implemented using SoC (System on Chip) technology.

8. The system of claim 1, the memory array is associated with a field programmable gate array.

9. The system of claim 1, the self-testing RAM interface is constructed with higher performance memory devices than the memory array including Gallium Arsenide based devices.

10. The system of claim 1, the self-testing RAM interface comprises large geometry devices and ECC, wherein the large geometry and ECC make the RAM interface less susceptible to errors than the memory array.

11. The system of claim 1, the self-testing RAM interface supports multiport memory access.

12. The system of claim 1, wherein upon computer system start-up, the self-testing RAM interface effectuates all testing procedures to make portions of tested RAM available to the CPU while the CPU concurrently runs boot process.

13. A self-testing and self-validating memory system comprising:
 one or more memory storage banks;
 at least one central processing unit (CPU) with a self-testing RAM interface subsystem for ensuring correct data retrieval; and
 a second microprocessor embedded in a single circuit board with the memory banks, the CPU and the memory banks are embedded in separate circuit boards; the self-testing RAM interface subsystem cooperates with the CPU to facilitate testing memory storage banks by dividing the memory storage banks, so that the CPU and the microprocessor concurrently test the memory storage banks thus facilitating faster testing of the memory storage bank.

14. The system of claim 13, the storage banks comprising standard RAM components with internal flaws.

15. The system of claim 13, the self-testing RAM interface is constructed with higher performance memory devices than the memory array including Gallium Arsenide based devices.

16. The system of claim 13, the self-testing RAM interface comprises large geometry devices and ECC, wherein the large geometry and ECC make the RAM interface less susceptible to errors than the memory storage banks.

17. The system of claim 13, the self-testing RAM interface acts as a virtual memory manager and maps received data to multiple copies of the data in different memory banks to enable correct data retrieval.

18. The system of claim 17, error correction codes (ECCs) and voting mechanisms determine the most probable data value to return from amongst the multiple copies.

19. A self-correcting and self-validating RAM device comprising:
 a plurality of internal memory stores;
 at least one central processing unit (CPU);
 a microprocessor embedded with the memory stores on a circuit board; and
 a self-testing interface that includes the microprocessor and maps input addresses and data to a multitude of memory cells on a plurality of memory stores to facilitate accurate data storage and retrieval, wherein the memory cells store copies of the input data and the self-testing interface cooperates with the CPU to facilitate testing memory stores by dividing the memory stores, so that each of the CPU and the microprocessor concurrently test the stores thus facilitating faster testing of the memory stores.

20. The device of claim 19, error correction codes (ECCs) and voting mechanisms determine the most probable data value to return from amongst the plurality of stored copies.

21. A method whereby a memory device tests itself comprising:
 writing values to one or more memory cells in a memory device;
 reading the values stored by the one or more memory cells;
 comparing the values written with the values read;
 notifying a central processing unit if any of the values written differ from the values read, wherein writing values, reading a value, comparing values, and notifying a central processing unit are performed by a self-testing RAM interface, the self-testing RAM interface further comprising a microprocessor, the self-testing RAM interface is embedded with the memory cells on a single circuit board; and
 testing the one or more memory cells by dividing the memory cells, so that the CPU and the self testing RAM interface concurrently test the cells thus facilitating faster testing of the memory cells.

22. The method of claim 21, the values written correspond to a test pattern.

23. The method of claim 21, the central processing unit is notified by generating an interrupt.

24. The method of claim 21, further comprising bringing the memory device on-line for use upon successful test completion.

25. An article of manufacturing comprising a computer usable medium having computer readable stored instructions thereon to perform the method of claim 24.

26. An article of manufacturing comprising a computer usable medium having computer readable instructions stored thereon to perform a method for testing a central processing unit (CPU) to memory interface comprising:
 loading a data pattern into CPU registers;
 writing the pattern from the registers to at least a portion of memory in a memory device;
 reading the data written to each memory cell;
 comparing the data written with the data expected in accordance with the pattern; and
 notifying the CPU if any data read is different than the data expected, wherein reading the data, comparing the data, and notifying the CPU are performed by a self-testing RAM interface;
 embedding a second microprocessor in a single circuit board with the memory device, the CPU and the memory device are formed of different integrated circuits; and
 dividing memory cells on the memory device so that the CPU and the second microprocessor concurrently test the cells thus facilitating faster testing of the memory cells.

27. A method for detecting hard errors comprising:
 writing a test pattern to a plurality of memory cells in a memory device;
 reading the value of each memory cell containing a portion of the test pattern;
 comparing the value read with the value written to each cell;
 notifying a central processing unit if any of the value written differ from the value read;

recording the number times the value written did not correspond to the value read for each cell, wherein writing a test pattern, reading the value, comparing the value, notifying a central processing unit and recording the number of times the value written did not correspond to the value read are performed by a self-testing RAM interface and controlled at least by a microprocessor integrated with the self-testing RAM interface and the self-testing RAM interface with the microprocessor is embedded in the memory device; and facilitating faster detection of hard errors by dividing the memory cells, so that the CPU and the microprocessor concurrently test the cells.

28. The method of claim 27, further comprising:

determining whether any cell or cells have produced erroneous results more than a threshold number of times;

determining whether any extra memory cells are available; and mapping any cells that have produced erroneous results more than a threshold number of times to available extra memory cells.

29. The method of claim 28, further comprising notifying an exception handler if there are no available extra cells.

30. The method of claim 27, wherein data regarding the number of times a cell value did not correspond to the value read is stored in a memory component located within the self-testing RAM interface.

31. A method of reading data from a self-testing RAM device comprising:

choosing a memory address;

retrieving data from a memory location associated with the address;

determining whether the data is correct;

notifying a central processing unit if the data is incorrect;

correcting the data if it is incorrect;

outputting the data to the requesting device, wherein the method disclosed hereby is performed by a self-testing RAM interface;

the self-testing RAM interface further comprises a microprocessor, and the interface is part of a circuit board that includes the memory location; and dividing a memory device including the memory address, so that each of the CPU and the microprocessor concurrently test the memory device.

32. The method of claim 31, wherein the self-testing RAM interface determines whether data is correct by utilizing an error correction code.

33. The method of claim 32 wherein the self-testing RAM interface corrects incorrect data by retrieving a copy of the data from another data source.

34. The method of claim 33, wherein the data source is a magnetic disk drive.

35. The method of claim 33, wherein the data source is cache memory.

36. The method of claim 33, wherein the data source is one or more standard RAM devices.

37. The method of claim 36, wherein the RAM devices contain internal flaws such that the device is not fit for ordinary use.

38. The method of claim 31, wherein the self-testing RAM interface determines whether data is correct by retrieving a copy of the data from another storage device and comparing the retrieved data and the copy.

39. An article of manufacturing comprising a computer usable medium having computer readable program code means stored thereon to perform the method of claim 31.

\* \* \* \* \*